UNITED STATES PATENT OFFICE.

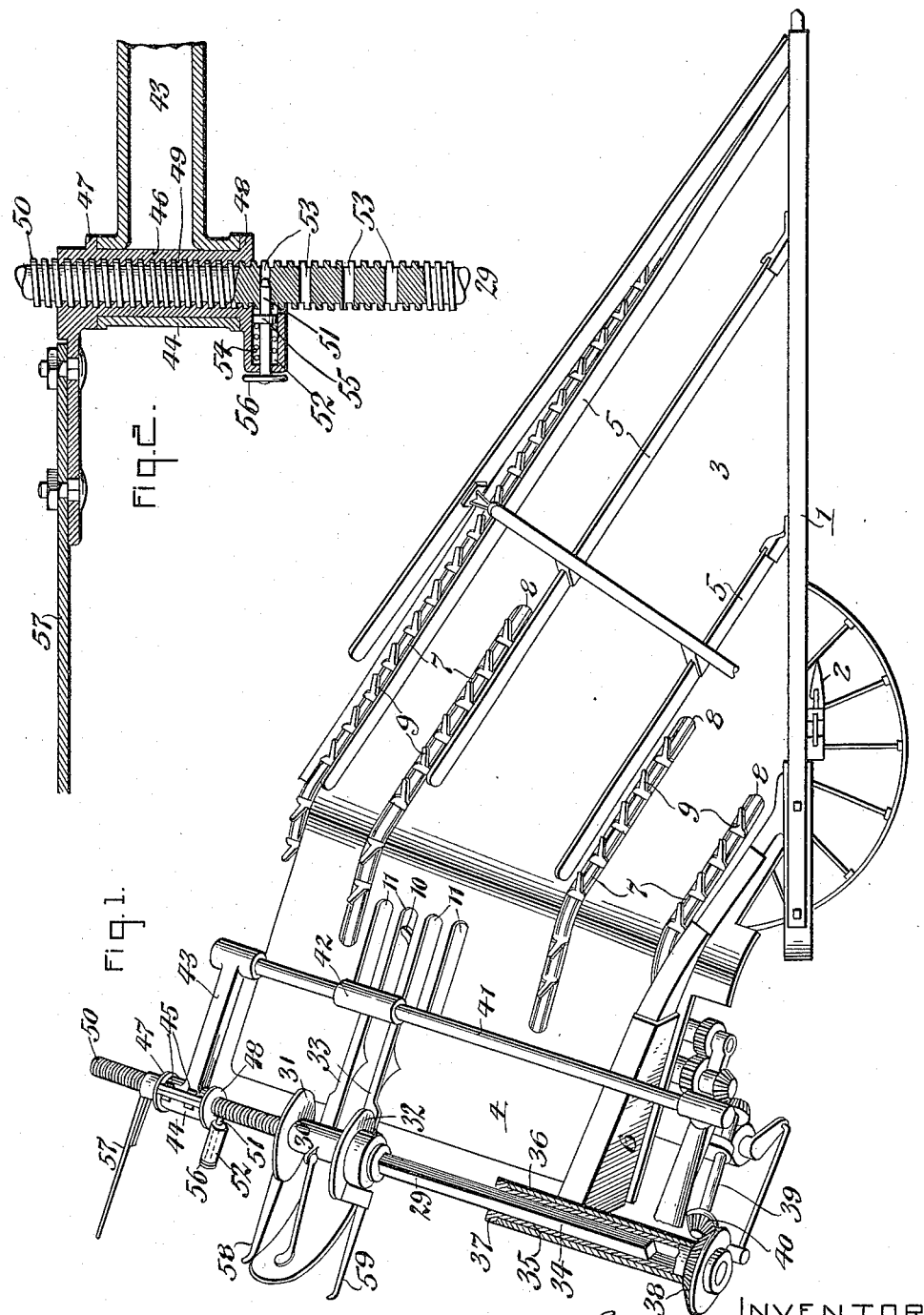

GEORGE A. FARRALL AND CHRISTIAN MAUL, OF BATAVIA, NEW YORK, ASSIGNORS TO THE JOHNSTON HARVESTER COMPANY, OF BATAVIA, NEW YORK, A CORPORATION OF NEW YORK.

CORN-HARVESTER.

1,159,370.  Specification of Letters Patent.  Patented Nov. 9, 1915.

Application filed June 8, 1914. Serial No. 843,626.

*To all whom it may concern:*

Be it known that we, GEORGE A. FARRALL and CHRISTIAN MAUL, citizens of the United States, residing at Batavia, in the county of Genesee and State of New York, have invented new and useful Improvements in Corn-Harvesters, of which the following is a specification.

The object of this invention is to provide simple, efficient and durable means whereby the knotter mechanism of a harvester for corn stalks and the like may be readily, quickly and conveniently adjusted lengthwise of the stalks to enable the binder mechanism to tie the band, cord or twine around bundles of stalks of varying length. A knotter mechanism adjusting device of this character is shown in Letters Patent of the United States #657,651, granted September 11, 1900.

In the accompanying drawings: Figure 1 is a side elevation, partly in section, of a corn harvester containing our improved knotter mechanism adjusting device viewed from the grainward side. Fig. 2 is a fragmentary vertical section, on an enlarged scale, of the upper part of the knotter shaft and adjacent parts.

Similar characters of reference indicate corresponding parts in both figures.

1 represents the main frame of the corn harvester which may be of any suitable construction to support the various movable parts of the machine and which is supported on the ground while being hauled over the same by means of wheels in the usual and well known manner. On the lower front portion of the main frame the same is provided with the usual cutter mechanism 2 whereby the corn stalks are cut off during the forward movement of the machine. Arranged lengthwise on the main frame is the inclined conveyer platform 3 which extends rearwardly from the cutter mechanism on the stubbleward side thereof and has its lower portion nearer the grainward side of the machine while its upper portion is nearer the stubbleward side of the machine. Extending rearwardly and stubbleward from the rear end of the conveyer platform is the inclined binder deck 4. This deck and the platform together constitute the stubbleward side of the passage or throat through which the stalks pass rearwardly through the machine after being severed by the cutter, the grainward side of this throat or passage being formed principally by longitudinal bars 5 supported on the adjacent part of the main frame. In passing through the throat the corn stalks are supported at their lower or butt ends by a bottom 6 extending rearwardly and upwardly along the rear part of the conveyer platform and the lower part of the binder deck. The corn stalks are carried in an upright position through this throat from the cutter mechanism to the binder mechanism which is mounted adjacent to the binder deck by means of a conveyer mechanism which may be of any suitable construction but which preferably comprises a plurality of feed belts 7 having their operative stretches passing rearwardly through longitudinal slots 8 in the platform and binder deck and provided with feeding teeth or wings 9 which project laterally from these belts into the stalk passage or throat so that they engage the corn stalks and move the same rearward positively.

10 represents the binder needle which is arranged in rear of the binder deck while in its inoperative position and which is adapted to pass back and forth through one or another of a vertical series of slots 11 in the deck and coöperate with the knotter mechanism arranged on the opposite side of the stalk throat for tying the band, twine or cord around the bundle of stalks. The mechanism for imparting this movement to the needle may be of the usual and well known character and the same is therefore not shown in the drawings. The needle is also capable of vertical adjustment so that the same—in coöperation with the knotter mechanism may tie a band, cord or twine around the proper place of bundles of stalks of varying length. Various means may be employed for effecting this adjustment those shown in Letters Patent previously referred to being suitable.

The knotter mechanism may be of the usual and well known construction the parts shown in the drawings for locating the same comprising an upright knotter shaft 29 arranged opposite the face of the binder deck, a knotter frame 30 mounted loosely on the knotter shaft opposite the binder needle, upper and lower knotter cams 31, 32 arranged on the knotter shaft above and below the knotter frame, and a breast plate 33 mounted on the inner part of the knotter frame. The lower part 34 of the knotter shaft is arranged within an upright bearing sleeve 35, the connection between these parts being of such a character that the knotter shaft is compelled to turn with the bearing sleeve but is free to slide vertically therewith, this being preferably effected by making the lower part of the knotter shaft square in cross section and the bore of the bearing sleeve of corresponding form, as shown in Fig. 1. The bearing sleeve is journaled in an upright bearing or standard 36 mounted on the main frame and is held against vertical movement by means of a collar or flange 37 arranged at the upper end of the bearing sleeve and engaging with the upper end of the bearing 36 and a gear wheel 38 secured to the lower end of the bearing sleeve and engaging with the lower end of the bearing 36, as shown in Fig. 1. The knotter shaft, the bearing sleeve and the parts associated therewith may be turned in the proper direction for operating the knotter mechanism by any suitable means, for instance, by means of a horizontal driving shaft 39 journaled on the main frame below the throat bottom and provided with a bevel gear pinion 40 which meshes with the teeth of the gear wheel 38. By means of this connection between the knotter mechanism and the driving mechanism it is possible to shift the knotter mechanism into any position vertically between its upper and lower limits to coincide with the position of the needle, thereby enabling the binder mechanism to be located for properly binding bundles of corn stalks which vary considerably in length and still permit of placing the band at the most desirable place around the same.

The vertical adjustment of the knotter mechanism may be accomplished by various means those shown in the drawings being suitable and constructed as follows: 41 represents an upright guide bar or rod arranged in front of the needle shaft and parallel therewith and mounted at its lower end on the adjacent part of the main frame. At its front end the breast plate is provided with a guide sleeve 42 which slides vertically on the guide rod 41. 43 represents a fixed arm or bracket projecting rearwardly from the upper end of the guide rod 41 and provided at its rear end with a stationary bearing 44 which is practically mounted on the main frame. This bearing is preferably divided lengthwise for a purpose which will presently appear and the sections thereof are detachably connected by bolts 45, as shown in Fig. 1, or by any other suitable means. Journaled in the bearing 44 is an adjusting sleeve 46 which can turn in this bearing but is held against axial movement therein by means of upper and lower stop collars or shoulders 47, 48, arranged on this adjusting sleeve and engaging with the upper and lower ends of said bearing 44. In its bore this adjusting sleeve is provided with an internal screw thread 49 which engages with external screw threads 50 in the upper part of the knotter shaft which is arranged within said sleeve. Means are provided for coupling the adjusting sleeve and the knotter shaft for compelling these parts to turn together or uncoupling those parts for permitting the adjusting sleeve to be turned independently of the knotter shaft when it is desired to raise or lower the knotter mechanism. The locking or coupling device for this purpose may be variously constructed, that shown in the drawings being suitable and comprising a locking bolt or pin 51 arranged radially in a socket 52 on the lower stop collar 48 and adapted to engage its inner end with one of a longitudinal row of openings 53 formed on the knotter shaft, four of such openings being preferably employed and spaced to correspond with the needle slots 11 in the deck. This locking bolt is yieldingly held in its inner operative position by means of a spring 54 surrounding the central part of this bolt and bearing at its outer end against the seat at the bottom of said socket while its inner end engages with a collar or shoulder 55 on the locking bolt. The latter may be withdrawn from the respective opening in the knotter shaft by a handle or finger piece 56 arranged on the outer end of the locking bolt. When the adjusting sleeve is locked on the knotter shaft the same practically forms a part of the latter and during the operation of the harvester this adjusting sleeve turns in the fixed bearing 44 and forms a pivotal support for the upper end of the knotter shaft. When it is desired to raise or lower the knotter mechanism so that the same stands opposite a different part of the path of the corn stalks for placing the band around bundles varying in length this is accomplished by first withdrawing the locking bolt so as to uncouple the knotter shaft and adjusting sleeve. The latter can now be turned in either direction independently of the knotter shaft whereby the knotter mechanism owing to the action of the screw connection between the knotter shaft and the adjusting sleeve is either raised or lowered. After the knotter mechanism has been adjusted to the desired position the locking bolt is engaged with the corresponding opening 53 of the knotter shaft for restoring the normal operative condition of the parts. The turning of the adjusting sleeve independently of the knotter shaft may be effected in various ways but preferably by means of an arm 57 projecting laterally from the upper end of the adjusting sleeve. This arm is preferably of such length that it sweeps the path of the stalks and serves as a discharge arm which together with two discharge arms 58, 59 on the upper and lower knotter cams constitute the means for ejecting the bundles of stalks from the deck after the same have been bound.

We claim as our invention:

1. A harvester comprising a binder deck, a feeding mechanism for moving the stalks past said deck, and a binder mechanism for tying a band around the bundles of stalks comprising a knotter shaft having an external screw thread, an adjusting sleeve having a thread which receives the thread on said knotter shaft, a fixed bearing in which said adjusting sleeve can turn but is held against axial movement, and means for coupling and uncoupling said adjusting sleeve and knotter shaft.

2. A harvester comprising a binder deck, a feeding mechanism for moving the stalks past said deck, and a binder mechanism for tying a band around the bundles of stalks comprising a knotter shaft having an external screw thread, an adjusting sleeve having a thread which receives the thread on said knotter shaft, a fixed bearing in which said adjusting sleeve can turn, stop collars arranged on said adjusting sleeve and engaging with opposite ends of said bearing for holding said sleeve against axial movement, and means for coupling and uncoupling said adjusting sleeve and knotter shaft.

3. A harvester comprising a binder deck, a feeding mechanism for moving the stalks past said deck, and a binder mechanism for tying a band around the bundles of stalks comprising a knotter shaft having an external screw thread, an adjusting sleeve having a thread which receives the thread on said knotter shaft, a fixed bearing in which said adjusting sleeve can turn but is held against axial movement, a discharge arm projecting laterally from said adjusting sleeve, and means for coupling and uncoupling said adjusting sleeve and knotter.

4. A harvester comprising a binder deck, a feeding mechanism for moving the stalks past said deck, and a binder mechanism for tying a band around the bundles of stalks comprising a knotter shaft having an external screw thread and a longitudinal row of openings, an adjusting sleeve having a thread which receives a thread on said knotter shaft, a fixed bearing in which said adjusting sleeve can turn but is held against axial movement, and means for coupling and uncoupling said adjusting sleeve and knotter shaft comprising a locking member movably mounted on said adjusting sleeve and adapted to be engaged with one or other of said longitudinal row of openings in said knotter shaft.

5. A harvester comprising a binder deck, a feeding mechanism for moving the stalks past said deck, and a binder mechanism for tying a band around the bundles of stalks comprising a knotter shaft having an external screw thread and a longitudinal row of openings, an adjusting sleeve having a thread which receives a thread on said knotter shaft, a fixed bearing on which said adjusting sleeve can turn but is held against axial movement, and means for coupling and uncoupling said adjusting sleeve and knotter shaft comprising a socket arranged on said adjusting sleeve, a locking bolt having a shoulder and mounted in said socket and movable radially into and out of one or another of said row of openings in said shaft, a spring interposed between said shoulder on said bolt and a seat in said socket, and a handle connected with said bolt.

Witness our hands this 29th day of May, 1914.

GEORGE A. FARRALL.
CHRISTIAN MAUL.

Witnesses:
LEWIS D. COLLINS,
WILLIS R. MAUL.

Copies of this patent may be obtained for five cents each, by addressing the "Commissioner of Patents, Washington, D. C."